United States Patent Office 2,919,091
Patented Dec. 29, 1959

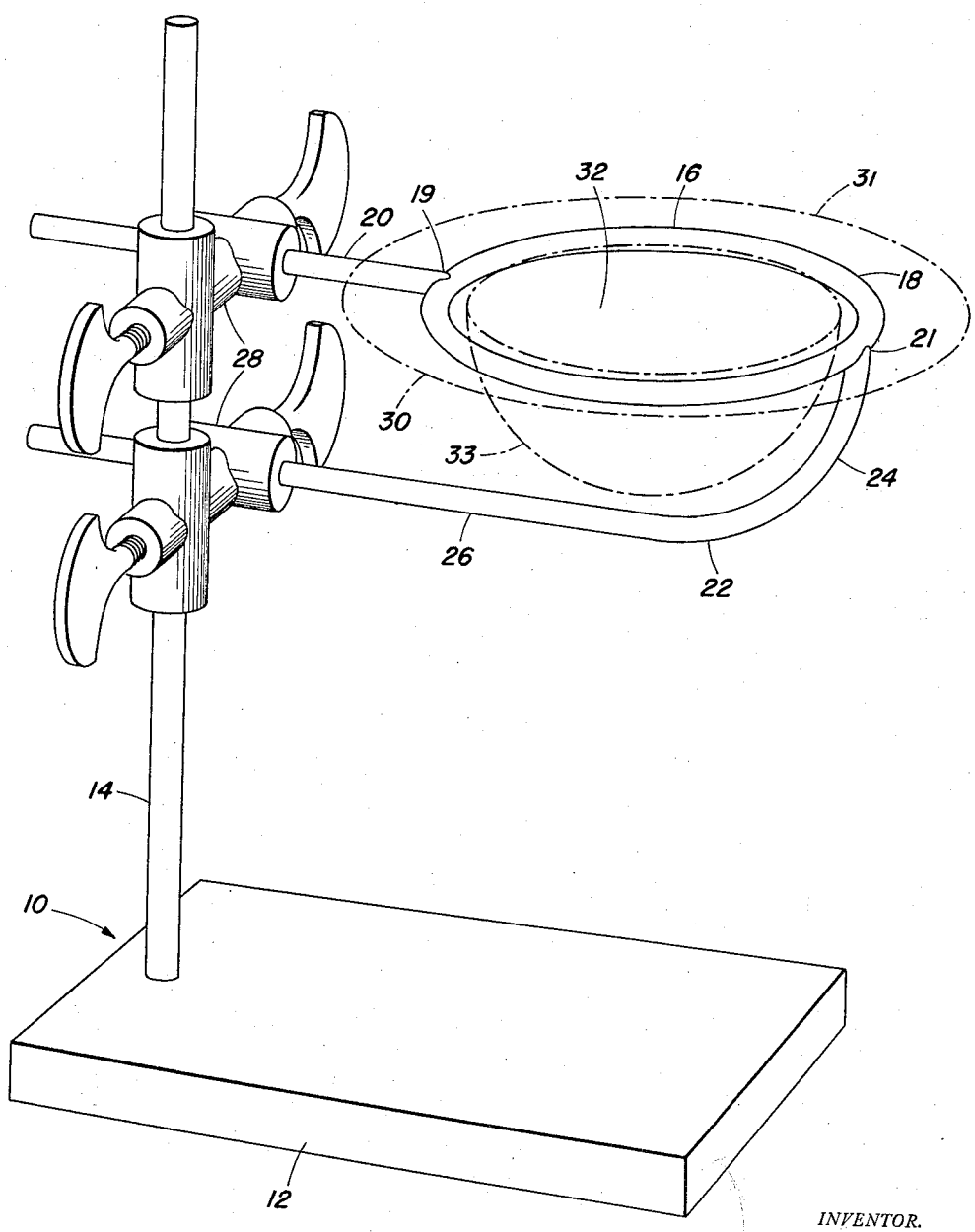
Fig. I.
INVENTOR.
Raymon E. VanderCook

2,919,091
LABORATORY SUPPORT RING

Raymon E. Vander Cook, Taylor Township, Mich., assignor to Wyandotte Chemicals Corporation, Wyandotte, Mich., a corporation of Michigan Application June 22, 1956, Serial No. 593,221

3 Claims. (Cl. 248—124)

This invention relates to an improved laboratory support ring. More particularly, it relates to a laboratory support ring provided with means for increasing the rigidity of the support ring structure under use conditions.

Laboratory support rings are well known and can be found in just about all kinds and types of laboratories, being commonly used to support beakers, flasks and the like. In brief, laboratory support rings comprise a metallic ring member and a straight, metallic support rod member which may be provided with means for clamping the same to so-called "ring stands" and the like. The straight bar member is usually integral with the ring member and it usually lies in the same plane as that of the ring member.

One specific use of laboratory support rings has been to support heating mantles and, on top of the heating mantle, laboratory distillation and fractionation equipment and the like. Such heating mantles and associated equipment are quite frequently bulky and heavy with the result that there is a tendency for the support ring to sag. Moreover, laboratory support rings under these conditions are not too rigid. Sag and lack of rigidity are highly undesirable in laboratory support rings because equipment to be supported, especially glassware and the like, is usually quite inflexible and fragile. Thus, there is a tendency when using conventional laboratory support rings in conjunction with heating mantles to incur equipment breakage. This problem has been with the art for many years but so far, to my knowledge, the problem has not heretofore been solved.

It is a general object of this invention to provide the art with a non-sagging and inflexible laboratory support ring.

More specifically, it is an object of this invention to improve upon conventional laboratory support rings so that the same are rendered non-sagging and inflexible, especially when used to support heavy and bulky laboratory equipment such as heating mantles.

Still more specifically, it is an object of this invention to provide the conventional laboratory support ring with auxiliary support means which cooperates under use conditions with the laboratory support ring to provide a rigid, non-sagging support for aluminum heating mantles and the like.

These and other objects which may appear as this specification proceeds are achieved by this invention which, in summary, comprises a laboratory support ring of conventional structure and, in combination therewith, auxiliary support means associated with that portion of the periphery of the ring member which is oppositely disposed to the portion of the periphery of the ring member integral with the support rod member.

In a specific embodiment of this invention such means comprise an auxiliary support rod member having a straight rod section spacedly set apart from, but parallel to, the support rod member of the ring and in a plane perpendicularly disposed to the plane of said ring, and a traverse section extending to said straight rod section from a portion of the periphery of the ring generally opposite to that portion of the ring periphery to which the main support rod is joined. The traverse section of the auxiliary support rod member may be curved or straight. In any event, it is positioned transversely to the plane of the ring. The distance between the straight rod member and the straight rod section as well as the curvature or angle of the traverse section should be such as to enable the bowl portion of a heating mantle or of a flask and the like to be accommodated when in position on the ring.

Both support rods may be provided with clamping means integral therewith for attaching the supoprt ring of this invention to the post of a ring stand or to vertical rods of a laboratory set-up stand. On the other hand, the clamping means need not be integral therewith and in many cases this may be of advantage where it is desired to be able to adjust the distance of the support ring, and thus the heating mantle, from the ring stand post or laboratory set-up rod.

Before proceeding to a description of the drawing it should be understood that this invention may be embodied in several forms without departing from the spirit or essential characteristics thereof and that the embodiment shown in the drawing is therefore illustrative and not restrictive, since the scope of the invention is defined by the appended claims rather than by the description preceding them, and all changes that fall within the metes and bounds of the claims and of forms that are their functional as well as conjointly cooperative equivalents are intended to be embraced by those claims.

The drawing consisting of only one view, Fig. 1, shows in perspective a preferred embodiment of the novel support ring of this invention.

In somewhat more detail it will be observed that in Fig. 1 there is shown a ring stand 10 having a base 12 and a vertically disposed post 14. Positioned in perpendicular relation to said post 14 is a laboratory support ring 16 comprising a ring member 18 and, joined thereto at a given position 19 on its outside periphery, a straight, main support rod member 20. This support rod lies in the same plane as the ring member 18.

Opposite the position 19 whereat the main support rod member is joined to the ring member 18, there is joined to the ring member at a position 21 on the outer periphery an auxiliary support rod 22. This support rod comprises a curved section 24 and a straight section 26 that is generally parallel to the main support rod member 20. Said straight section 26, it will be observed, is also positioned in a plane perpendicularly disposed to the plane of said ring member 18. The laboratory support ring 16 is rigidly positioned in space in association with the ring stand 10 by a pair of conventional right angle, thumbscrew clamps 28 which are clamped to the ring stand post 14 and which engage the support rod member 20 and the straight rod section 26 to auxiliary support rod 22 and the ring stand post 14.

In order to illustrate the utility of this invention, the shape of a conventional heating mantle 30 is indicated in the drawing by dashed lines. This heating mantle comprises an annular lip 31 surrounding a cup-shaped, cloth lined depression 32 adapted to receive distillation flasks and the like. The underside of the heating mantle is encased in a bowl-shaped housing 33 which was referred to in the foregoing part of this specification as the heating mantle bowl. The distance between the main support rod member 20 and the straight rod section 26 of the auxiliary support rod member 22 and the curvature of the curved section 24 of the auxiliary support rod should be sufficient to enable the ring to accommodate the heating mantle 30.

Actual use of the improved laboratory ring of this invention has been quite successful. Breakage of glass equipment and loosening of glass friction connections that would have been the result of sagging and flexibility of the support ring have been substantially eliminated with the improved laboratory support ring of this invention.

What is claimed is:

1. An improved laboratory support ring comprising a load-bearing ring member; a generally straight, main support rod member in the plane of said ring and joined to said ring member at a portion of the outer periphery thereof; and a single, rigid, auxiliary support rod member comprising a traverse section joined to a straight rod section, said traverse section being arranged transversely to said plane and joined to that portion of the outer periphery of said ring member oppositely disposed to the portion of said periphery joined to said main support rod member, said traverse section being curved from where it joins said ring to where it joins said straight rod section, said straight rod section being arranged parallel to said main support rod member and in a plane perpendicularly disposed to the plane of said ring member, said auxiliary support rod imparting inflexible and non-sagging characteristics to said support ring.

2. An improved laboratory ring according to claim 1 wherein said main support rod member and said straight rod section of said auxiliary support rod comprise clamping means integral therewith for attaching said ring to the post of a ring stand.

3. In a laboratory distillation apparatus consisting of a round bottom glass flask in combination with a glass distillation column wherein said flask is disposed within a hemispherical heating mantle containing a laterally extending shoulder along the upper edge thereof, the improvement which comprises a laboratory support ring, adapted to support the mantle, comprised of a load-bearing ring member joined to a main support rod member disposed in the plane of said ring member and clamped to a ring stand post, said laboratory support ring being adapted with a single, rigid, auxiliary support rod member comprising a traverse section joined to a straight rod section, said traverse section being positioned transversely to the plane of said ring member and poined to that portion of the outer periphery of said ring member oppositely disposed to the portion of said periphery joined to said main support rod member, said traverse section of said auxiliary support being curved from where it joins said ring member to where it joins said straight rod section, said straight rod section being located in a plane of said support rod member perpendicularly disposed to the plane of said ring member and being clamped to said ring stand post.

References Cited in the file of this patent

UNITED STATES PATENTS

| 1,397,453 | Rekar | Nov. 15, 1921 |
| 2,598,529 | Fritz | May 27, 1952 |

FOREIGN PATENTS

| 847,337 | Germany | Aug. 21, 1952 |

UNITED STATES PATENT OFFICE

CERTIFICATE OF CORRECTION

Patent No. 2,919,091                          December 29, 1959

Raymon E. Vander Cook

It is hereby certified that error appears in the printed specification of the above numbered patent requiring correction and that the said Letters Patent should read as corrected below.

Column 2, line 57, for "to" read -- of --; column 4, line 13, for "poined" read -- joined --.

Signed and sealed this 14th day of June 1960.

(SEAL)
Attest:

KARL H. AXLINE                            ROBERT C. WATSON
Attesting Officer                          Commissioner of Patents